United States Patent
Shi et al.

(10) Patent No.: US 11,299,434 B2
(45) Date of Patent: Apr. 12, 2022

(54) SPECIAL DEVICE AND METHOD FOR CEMENT PRODUCT SURFACE MICROCRYSTALLIZATION

(71) Applicant: INNER MONGOLIA UNIVERSITY OF TECHNOLOGY, Inner Mongolia (CN)

(72) Inventors: Yong Shi, Inner Mongolia (CN); Jianli Dong, Inner Mongolia (CN)

( * ) Notice: Subject to any disclaimer, the term of this patent is extended or adjusted under 35 U.S.C. 154(b) by 0 days.

(21) Appl. No.: 17/049,745

(22) PCT Filed: Aug. 1, 2019

(86) PCT No.: PCT/CN2019/098804
§ 371 (c)(1),
(2) Date: Oct. 22, 2020

(87) PCT Pub. No.: WO2020/048266
PCT Pub. Date: Mar. 12, 2020

(65) Prior Publication Data
US 2021/0246079 A1    Aug. 12, 2021

(30) Foreign Application Priority Data

Sep. 7, 2018   (CN) .......................... 201811043496.5

(51) Int. Cl.
*B28B 1/08* (2006.01)
*C04B 40/00* (2006.01)
(Continued)

(52) U.S. Cl.
CPC ................................ *C04B 40/0067* (2013.01)

(58) Field of Classification Search
USPC ............................................ 106/638; 264/69
See application file for complete search history.

(56) References Cited

U.S. PATENT DOCUMENTS

| | | | |
|---|---|---|---|
| 4,725,220 A * | 2/1988 | Percinel | B28B 3/022 264/72 |
| 8,926,311 B1 * | 1/2015 | Schmidgall | B28B 7/28 425/432 |

(Continued)

FOREIGN PATENT DOCUMENTS

| | | |
|---|---|---|
| CN | 1051408 A | 5/1991 |
| CN | 101748895 A | 6/2010 |

(Continued)

OTHER PUBLICATIONS

ISA; China National Intellectual Property Administration; Beijing China; Oct. 17, 2019.

*Primary Examiner* — James E McDonough
(74) *Attorney, Agent, or Firm* — Patshegen IP LLC; Moshe Pinchas

(57) ABSTRACT

The invention discloses a special equipment and a method for surface microcrystallization of cementitious materials. The specialized equipment includes a vibrator, a vibration signal generator, a power amplifier and a vibration transmitting body. A signal output terminal of the vibration signal generator is connected to a signal input terminal of the power amplifier, a signal output terminal of the power amplifier is connected to a signal input terminal of the vibrator, the vibrator is connected to the vibration transmitting body, and the vibration transmitting body is to be in contact with the cement product after initial setting. The surface microcrystallization method for cement product: after the casting and before the final setting of the cement product, vibration is applied to its outer or inner surface, the vibration frequency is greater than or equal to 1 KHz, and the vibration time is greater than or equal to 5 minutes. The surface layer of the cement product prepared by the present invention forms a structured layer with a certain thickness, high density, low permeability and relatively uniform sur- (Continued)

face coverage of granular crystal or gel phase, so that the cement product has excellent anti-aging performance.

5 Claims, 16 Drawing Sheets

(51) Int. Cl.
*C04B 7/00* (2006.01)
*C04B 7/34* (2006.01)
*C04B 28/00* (2006.01)
*C04B 32/00* (2006.01)

(56) References Cited

U.S. PATENT DOCUMENTS

| | | | | |
|---|---|---|---|---|
| 2007/0082080 A1* | 4/2007 | Sandqvist | ............... | B28B 1/084 |
| | | | | 425/456 |
| 2015/0352745 A1* | 12/2015 | Eilola | ................... | E04G 21/025 |
| | | | | 264/69 |

FOREIGN PATENT DOCUMENTS

| | | | | | |
|---|---|---|---|---|---|
| CN | 105908973 | A | | 8/2016 | |
| CN | 108407044 | A | * | 8/2018 | |
| CN | 108407044 | A | | 8/2018 | |
| CN | 207813047 | U | | 9/2018 | |
| CN | 208133309 | U | | 11/2018 | |
| CN | 108975951 | A | * | 12/2018 | ......... C04B 40/0067 |
| CN | 108975951 | A | | 12/2018 | |
| JP | 2017014888 | A | | 1/2017 | |

\* cited by examiner

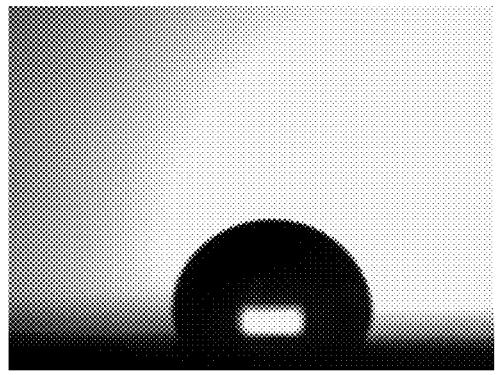 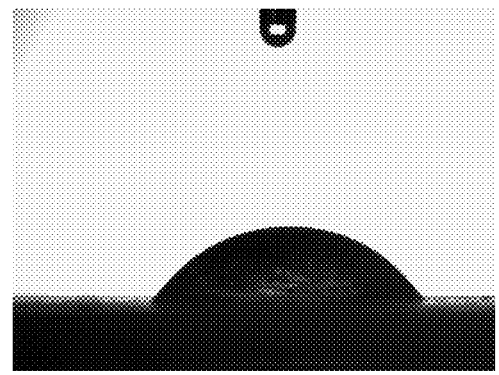
Figure17a  Figure17b
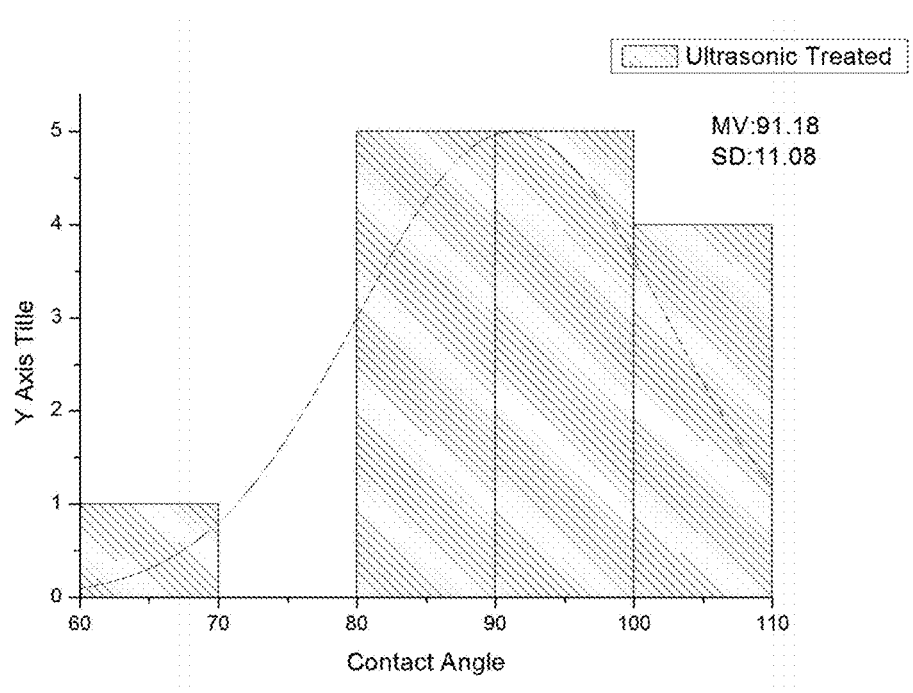
Figure18a

SPECIAL DEVICE AND METHOD FOR CEMENT PRODUCT SURFACE MICROCRYSTALLIZATION

TECHNICAL FIELD

The present invention relates to the technical field of preparation of cement product. More specifically, it relates to a special equipment for surface microcrystallization of cementitious materials and a method for surface microcrystallization of cementitious materials.

BACKGROUND

The anti-aging properties of cement product, including cement paste, mortar, and concrete products are important indicators that affect the life time of cement product. After mixing and casting, the cement product begins the hydration process, undergoes the process of initial setting, final setting and late hydration. In this process, crystals such as hydrated silicate, ettringite, calcium hydroxide, etc. are formed, and the crystals keep growing and getting bigger during the entire hydration process. The surface of conventional cement product is composed of underdeveloped silicate crystals, unhydrated silicate particles, coarse columnar or needle-shaped ettringite and calcium hydroxide crystals. The surface of the cement product produced by conventional process is rough with microscopic observation, there are a lot of tiny holes, and the formed columnar or needle-shaped ettringite and calcium hydroxide crystals are long and thick, and the strength thereof is not high. These make it easy to be corroded by carbon dioxide, acid, alkali, salt, etc., making the anti-aging performance of cement product poor.

SUMMARY OF THE INVENTION

An object of the present invention is to provide a specialized equipment for surface microcrystallization of cementitious materials and a method for surface microcrystallization of cementitious materials that can make cementitious materials with good anti-aging properties.

To achieve above object, the invention uses following technical scheme:

Special equipment for surface microcrystallization of cementitious materials, it includes a vibrator, a vibration signal generator, a power amplifier and a vibration transmitting body, wherein a signal output terminal of the vibration signal generator is connected to a signal input terminal of the power amplifier, a signal output terminal of the power amplifier is connected to a signal input terminal of the vibrator, the vibrator is connected directly or indirectly to the vibration transmitting body, and the vibration transmitting body is to be in contact with an inner surface and/or outer surface of the cast cement product.

The special equipment for surface microcrystallization of cementitious materials as above, the vibration transmitting body is a mold, the cement product is located in the mold, and the vibrator is placed on the mold.

The special equipment for surface microcrystallization of cementitious materials as above, the vibration transmitting body is an inner mold, and a part of the inner mold is in contact with the inner surface of the cement product, and the other part is located outside the cement product, and the vibrator is placed on the part of the inner mold located outside the cement product.

The special equipment for surface microcrystallization of cementitious materials as above, the vibration frequency generated by the vibration signal generator is greater than or equal to 1 KHz.

A method for surface microcrystallization of cementitious materials, applying vibration to the cement product after its casting and before final setting, with a vibration frequency of greater than or equal to 1 KHz, and a vibration time of greater than or equal to 5 minutes.

The method for surface microcrystallization of cementitious materials, the vibration frequency is in the range from 1 KHz to 120 KHz.

The method for surface microcrystallization of cementitious materials as above, it comprises the following steps:

A. Preparing raw materials for casting cement product according to cement product preparation method in the prior art;

B. Installing the vibrator onto the vibration transmitting body, and connecting the vibration signal generator and the power amplifier; the signal output terminal of the vibration signal generator being connected to the signal input terminal of the power amplifier, the signal output terminal of the power amplifier being connected to the signal input terminal of the vibrator;

C. Casting to obtain a cement product, and bringing the vibration transmitting body into contact with the cement product; in the time period after the cement product is cast until the final setting, turning on the vibration signal generator and the power amplifier so as to apply vibration to the cement product;

D. Removing the vibrator and performing conventional maintenance operations on the cement product after the cement product is finally set.

The method for surface microcrystallization of cementitious materials, the vibration applied to the outer or inner surface of the cement product after casting and before final setting is continuous or intermittent vibration.

The method for surface microcrystallization of cementitious materials as above, the process of surface microcrystallization of cement product is as follows:

A. Preparing raw materials for casting cement product according to cement product preparation method in the prior art;

B. Installing the vibrator onto the mold, and connecting the vibration signal generator and the power amplifier; the signal output terminal of the vibration signal generator being connected to the signal input terminal of the power amplifier, the signal output terminal of the power amplifier being connected to the signal input terminal of the vibrator;

C. Casting into the mold to obtain a cement product, and turning on the vibration signal generator and the power amplifier so as to apply vibration to the cement product; the vibration is applied after casting and before final setting;

D. Removing the vibrator and performing conventional maintenance operations on the cement product after the cement product is finally set.

The method for surface microcrystallization of cementitious materials as above, the process of internal microcrystallization of cement product is as follows:

A. Preparing raw materials for casting cement product according to cement product preparation method in the prior art;

B. Installing the vibrator onto the inner mold, and connecting the vibrator, the vibration signal generator and the power amplifier; the signal output terminal of the vibration signal generator being connected to the signal input terminal of the power amplifier, the signal output terminal of the power amplifier being connected to the signal input terminal of the vibrator;

C. Casting to obtain a cement product; after the cement product is cast, turning on the vibration signal generator and the power amplifier so as to apply vibration to the outer or inner surface of the cement product; the vibration is applied after casting and before final setting;

D. Removing the vibrator and performing conventional maintenance operations on the cement product after the cement product is finally set.

The beneficial effects of the present invention are as follows:

The method for surface microcrystallization of cement product and the specialized equipment therefor according to the present invention consist in applying high-frequency vibration to the cement during its hydration process (after the cement product is cast and before the final setting; the effect of applying vibration after the final setting is relatively limited), so that a layer of dense hydrated silicate colloid is formed at the position where the surface layer is in contact with the vibration transmitting body under the action of vibration, and in the later cement hydration process, crystals in the form of fine particles develop on the surface of this layer of hydrated silicate colloid or the gel phase is kept. Thus, the characteristics of surface microcrystallization of cement product are presented. The microcrystalline cement product has the characteristics of high surface hardness, high density, low steam permeability, and better anti-aging performance (carbonization, freeze-thaw, acidic-basic salt erosion) than ordinary cement product. At the same time, cement-based materials treated with high-frequency vibration can absorb more solar radiation, which is conducive to heat absorption and ice melting of buildings and road materials in cold regions; cement-based materials treated with high-frequency vibration have higher surface tension and water droplets are not easy to adhere to their surface, resulting a very good anti-wetting and antiskid effects for pavement materials.

The principle of surface microcrystallization of cement product of the present invention: specialized equipment is designed to apply high-frequency vibration to the cement product during a period of time from casting to final setting of the cement, so that a layer of dense hydrated silicate colloid is formed in the position where the surface layer of the cement product is in contact with the vibration transmitting body, and in the later cement hydration process, fine granular crystals develop on the surface of this layer of hydrated silicate colloid or the gel phase is kept. The dense hydrated silicate colloid and the microcrystalline hydrate crystals on the surface make the surface of cement product denser and the permeability lower. At the same time, because the crystals have lower internal energy and better chemical stability, the cement product is less easy to be corroded and has better anti-aging performance.

The present invention proposes the densification of the surface layer of cement-based materials through high-frequency physical vibration. The principle of surface microcrystallize consists in applying external vibration during cement hydration to microcrystallize the hydrated product so as to obtain cement product with microcrystalline surface.

Vibration frequency: the applied vibration frequency is in a range, usually from 1 KHz to 120 KHz. The lower the frequency, the greater the depth of action; the higher the frequency, the smaller the depth of action, but the more concentrated energy.

Vibration site: vibration can be applied to the outer surface of the cement product or the inner surface of the cement product. When vibration is applied to the inner and outer surfaces of cement product, the vibrator can be directly or indirectly attached to the surface of the mold, and the mold acts as a vibration transmitting body.

Vibration period: vibration is started after the casting of the cement product, and ended before the final setting of the cement (the effect of applying vibration after the final setting is relatively limited). During this period, vibration can be continuous or intermittent.

If the frequency is high, the vibration energy is more concentrated on the surface and the depth of action is small; if the frequency is low, the vibration energy is transmitted to the inside more deeply, and the depth of action is greater.

The choice of vibrator. The principle of the present invention shows that both vibrators with low frequency of 1 KHz and ultrasonic vibrators with high frequency up to 120 KHz can form dense hydrated silicate colloid on the surface of cement product, and uniform granular crystals can be developed on the surface during the later hydration process or the gel phase is kept. The current commonly used vibrators, such as commonly used ultrasonic vibrators have a frequency up to 120 KHz. If a vibrator with higher frequency is produced, the same effect can be achieved. The inventor has completed the tests with 28 KHz, 40 KHz, 80 KHz, and 120 KHz vibrators, and all have achieved similar results and the goal of the present invention is achieved; therefore, the frequency of vibration applied to the surface of the cement product can be arbitrarily selected provided that it is greater than 1 KHz, and the same technical effects can be achieved.

With the same technical effects, the size of the output power will affect the length of vibration time. Under the condition of the same vibration frequency, if the power is small, the consumed time will be longer, but it has no essential effect on the result.

DESCRIPTION OF THE DRAWINGS

The specific embodiments of the present invention will be described in further detail below with reference to the accompanying drawings.

FIG. 17a shows a diagram for testing of surface tension of the cement-based material surface treated by the present inventive process, with glycerin as the drip; FIG. 17b shows a diagram for testing of surface tension of the cement-based material surface untreated by the present inventive process, with glycerin as the drip.

FIG. 18a shows a statistical graph of the surface tension of a cement paste product treated by the present inventive process, with glycerin as the drip.

Figure 1:
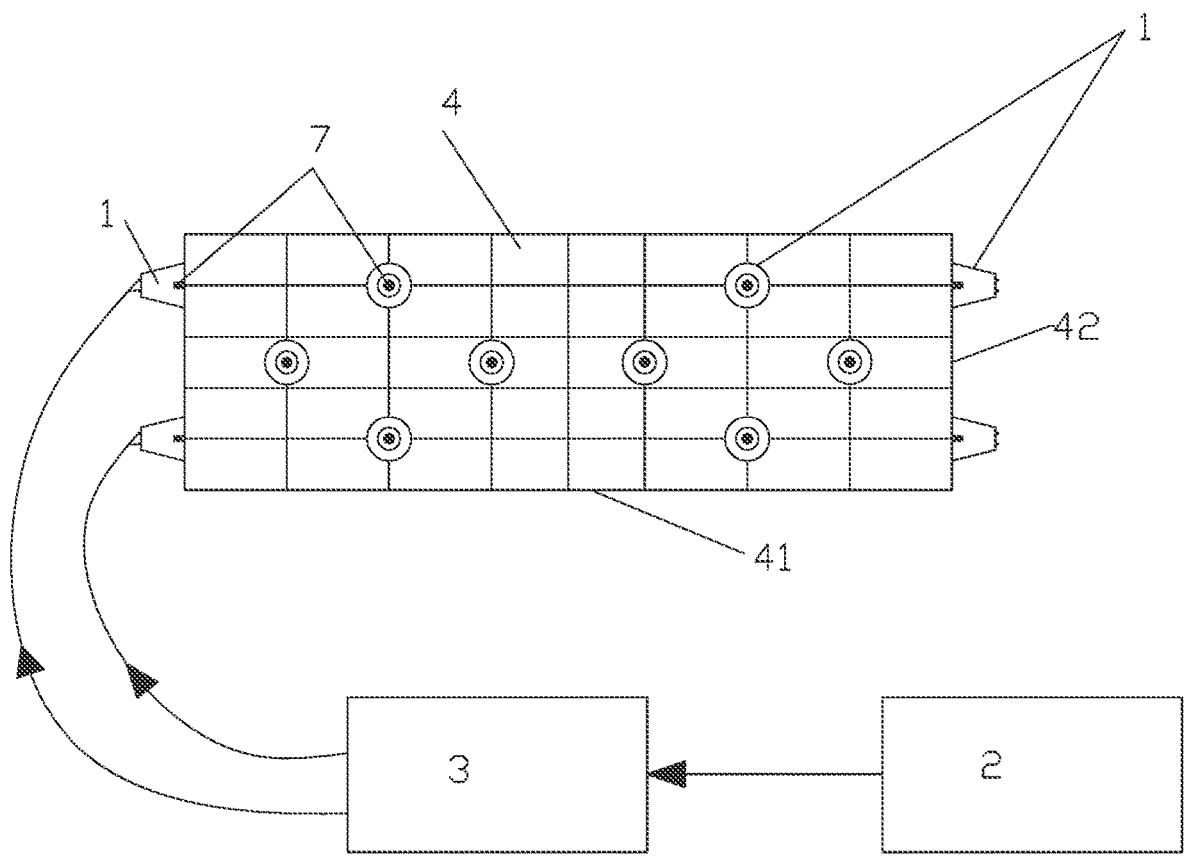
FIG. 1 is a schematic structural diagram of a specialized equipment for surface microcrystallization process of cement product according to the present invention.

In the FIG. 1—vibrator; 2—vibration signal generator; 3—power amplifier; 4—mold; 41—bottom mold; 42—side mold; 5—inner mold; 6—cement product; 7—screw.

DETAILED DESCRIPTION

The present invention is now described in more detail with reference to preferred examples and drawings, so that the present invention can be understood better. In the drawings, similar parts are referred to by the same reference numerals. Those skilled in the art should understand that the content described below is illustrative rather than restrictive, and should not limit the protection scope of the present invention.

Example 1

As shown in FIG. 1, the specialized equipment for surface microcrystallization of cement product in this example is used for surface microcrystallization of cement product, and includes a vibrator 1, a vibration signal generator 2, a power amplifier 3, and a mold 4. The signal output terminal of the vibration signal generator 2 is connected to the signal input terminal of the power amplifier 3, and the signal output terminal of the power amplifier 3 is connected to the signal input terminal of the vibrator 1. The cement product 6 is placed in the mold 4. The mold 4 includes a bottom mold 41 and a side mold 42, and the vibrator 1 is fixedly installed on the outer surfaces of the bottom mold 41 and the side mold 42 by screws 7. The vibration frequency generated by the vibration signal generator 2 is 40 KHz, the output power is 50 W, and one vibrator is arranged for every 400 cm$^2$ of the mold surface area.

Example 2

Figure 2:
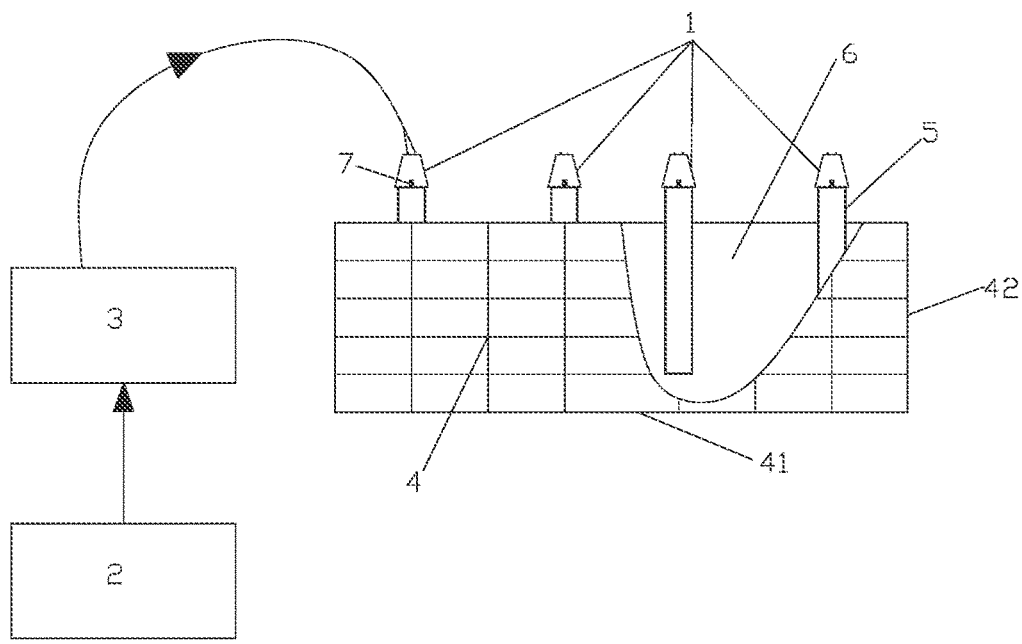
FIG. 2 is another schematic structural diagram of a specialized equipment for surface microcrystallization process of cement product according to the present invention.

As shown in FIG. 2, a specialized equipment for surface microcrystallization of cement product is used for surface microcrystallization of cement product, and includes a vibrator 1, a vibration signal generator 2, a power amplifier 3, and a vibration transmitting body. The signal output terminal of the vibration signal generator 2 is connected to the signal input terminal of the power amplifier 3, and the signal output terminal of the power amplifier 3 is connected to the signal input terminal of the vibrator 1.

The vibration transmitting body is an inner mold 5, a portion of which is in contact with the inner surface the cement product 6, and another portion is located outside of the cement product 6. The vibrator 1 is mounted by a screw 7 on the portion of the inner mold 5 located outside of the cement product 6. The vibration frequency generated by the vibration signal generator 2 is 120 KHz, the output power is 25 W, and one vibrator is arranged for every 400 cm$^2$ of the mold surface area.

Example 3

In the method for surface microcrystallization of cement product in this example, the process flow of the surface microcrystallization of cement product is as follows:

A. Preparing raw materials for casting cement product according to cement product preparation method in the prior art;

B. The mold 4 includes a bottom mold 41 and a side mold 42. The vibrator 1 is fixedly mounted on the outer surfaces of the bottom mold 41 and the side mold 42 by screws 7, and a vibrator is arranged for every 400 cm$^2$ mold surface area; Connecting the vibration signal generator 2 and the power amplifier 3; the signal output terminal of said vibration signal generator 2 is connected to the signal input terminal of the power amplifier 3, and the signal output terminal of the power amplifier 3 is connected to the signal input terminal of the high frequency vibrator 1.

C. Casting a cement product 6 in the mold 4; after casting, turning on the vibration signal generator 2 and the power amplifier 3 to apply vibration to the cement product 6; the vibration is applied after casting continuously or intermittently.

D. 20 hours after the casting of the cement product 6, removing the high-frequency vibrator 1 and perform conventional maintenance operation on the cement product 6.

Figure 3:
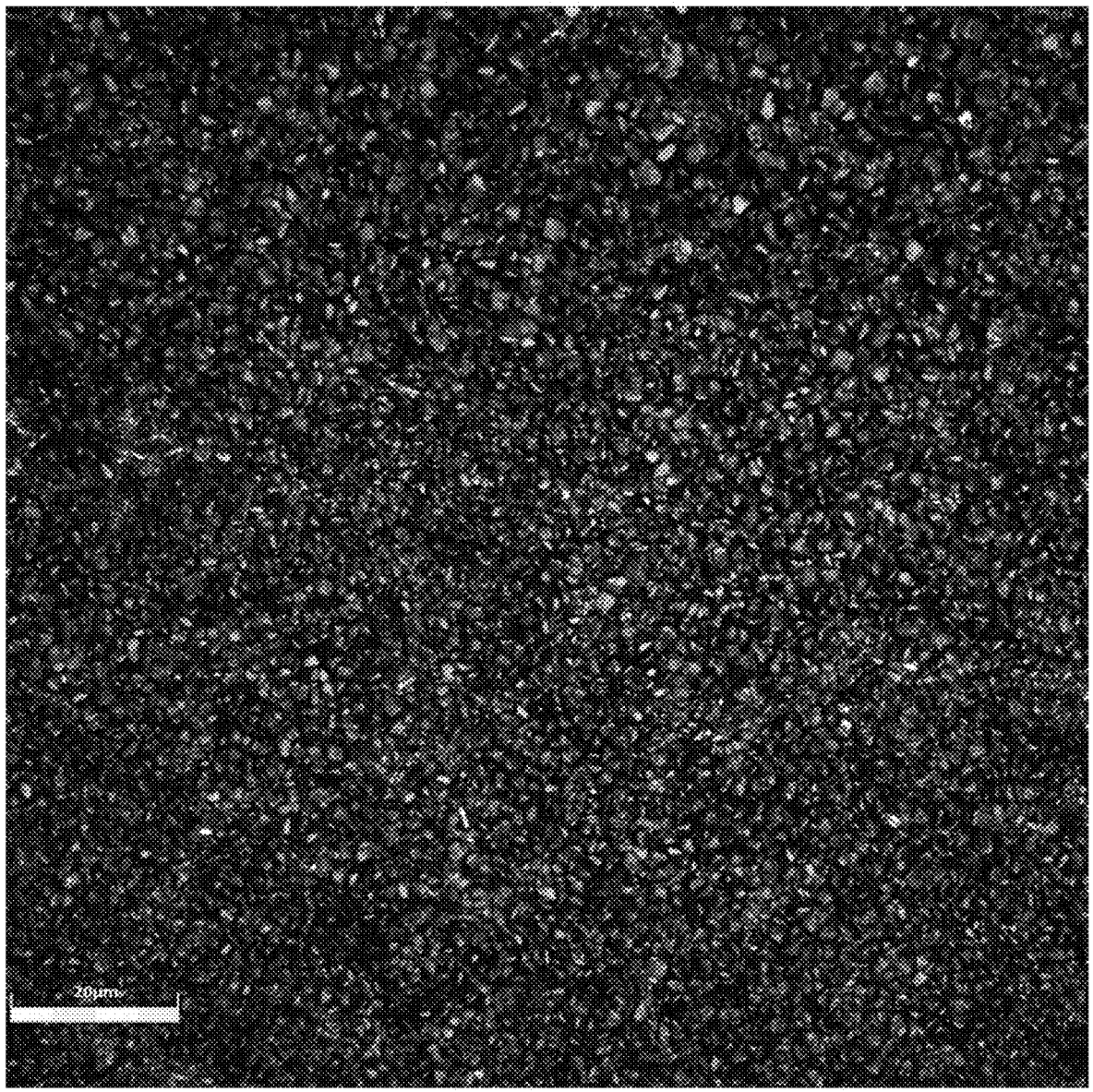
FIG. 3 shows the surface morphology of cement product treated according to the present invention using a vibration frequency of 40 KHz, an output power of 50 W, a vibration duration of 2 hours to 8 hours after casting, by repeated and intermittent vibrations with 15 min of vibration and 15 minutes of interval and so forth. The laser confocal picture is taken by Olympus OLS4100. It can be seen that the surface of the cement product is covered with uniform hydrated silicate crystals, the surface is dense, and the crystal gap is small.

FIG. 3 shows the surface morphology of cement product treated according to the present Example using a vibration frequency of 40 KHz, an output power of 50 W, a vibration duration of 2 hours to 8 hours after casting, by repeated and intermittent vibrations with 15 min of vibration and 15 minutes of interval and so forth. The laser confocal picture is taken by Olympus OLS4100. It can be seen that the surface of the cement product is covered with uniform hydrated silicate crystals, the surface is dense, and the crystal gap is small.

Figure 4:
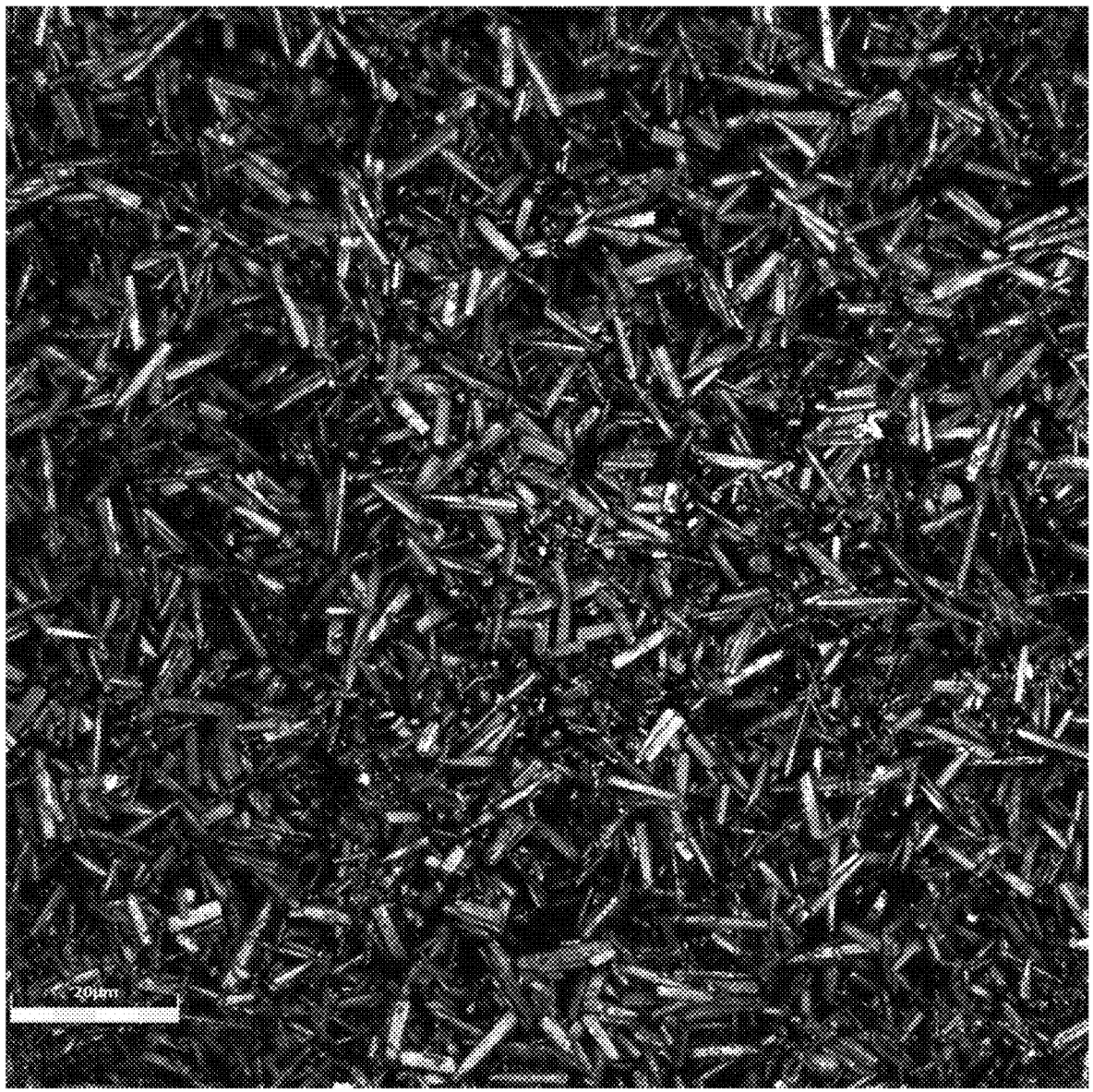
FIG. 4 shows the surface morphology of cement product untreated by the inventive process, a laser confocal picture taken by Olympus OLS4100. It can be seen that the surface of the cement product is composed of unhydrated silicate particles, columnar ettringite crystals, pores, etc. The surface of the cement product is not dense, the crystals are coarse, and the crystal gaps are large.

FIG. 4 shows the surface morphology of cement product untreated by the inventive process, a laser confocal picture taken by Olympus OLS4100. It can be seen that the surface of the cement product is composed of unhydrated silicate particles, columnar ettringite crystals, pores, etc. The surface of the cement product is not dense, the crystals are coarse, and the crystal gaps are large.

Figure 5:
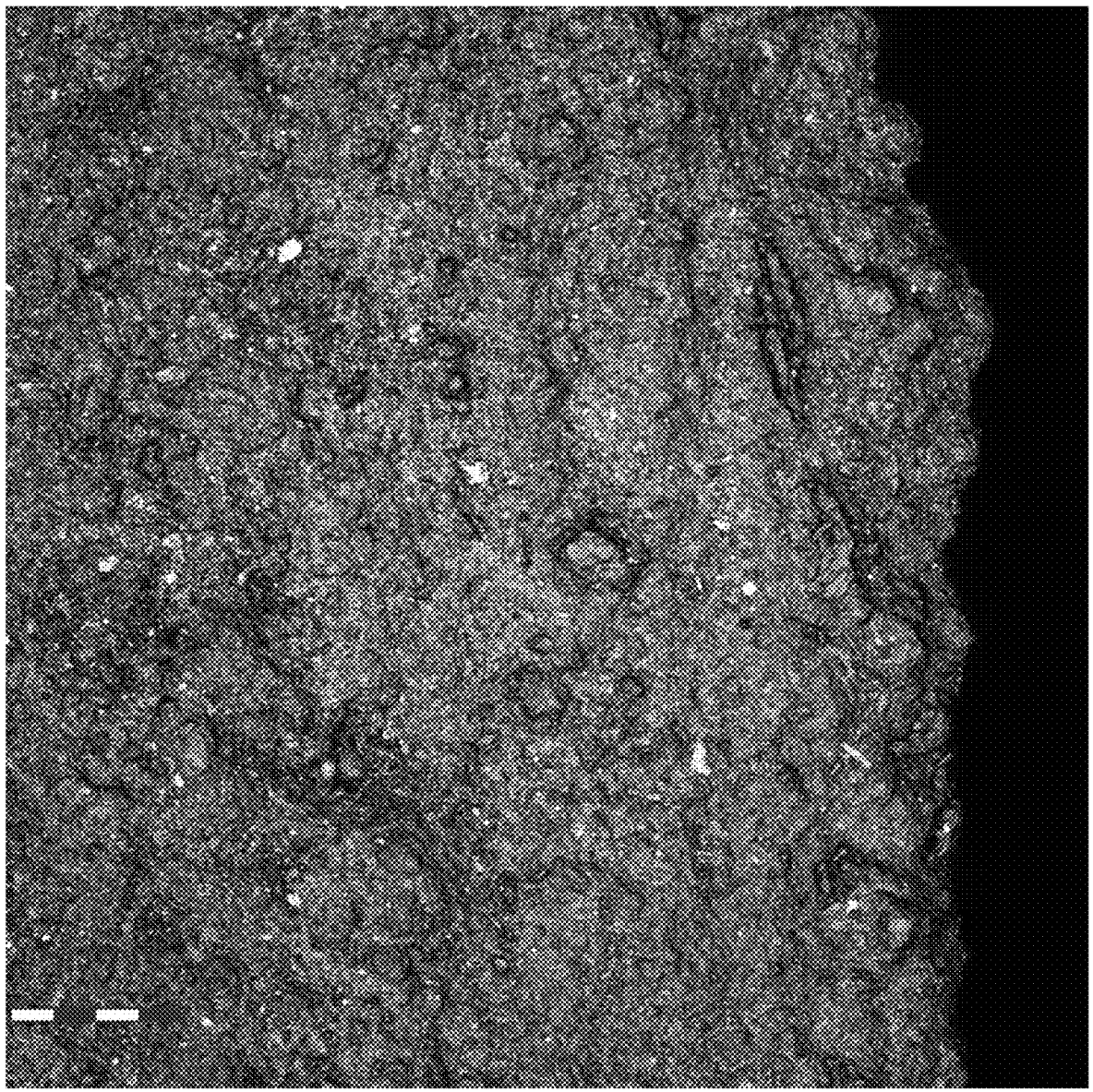
FIG. 5 shows the microscopic morphology of the sectioned surface of the cement paste product treated by the inventive process, using a vibration frequency of 40 KHz, an output power of 20 W, and a vibration duration of 10 minutes to 30 minutes after casting, the vibration being continuous. The laser confocal picture is taken by Olympus OLS4100. The right side is the natural surface of the cement product. It can be seen that a layer of dense, hydrated silicate colloid of about 160 μm is formed on the surface of the cement product. The left side is the interior of the cement product, which consists of underdeveloped and unhydrated silicate particles.

FIG. 5 shows the microscopic morphology of the sectioned surface of the cement paste product treated by the process of this Example, using a vibration frequency of 40 KHz, an output power of 20 W, and a vibration duration of 10 minutes to 30 minutes after casting, the vibration being continuous. The laser confocal picture is taken by Olympus OLS4100. The right side is the natural surface of the cement product. It can be seen that a layer of dense, hydrated silicate colloid of about 160 μm is formed on the surface of the cement product. The left side is the interior of the cement product.

Figure 6:
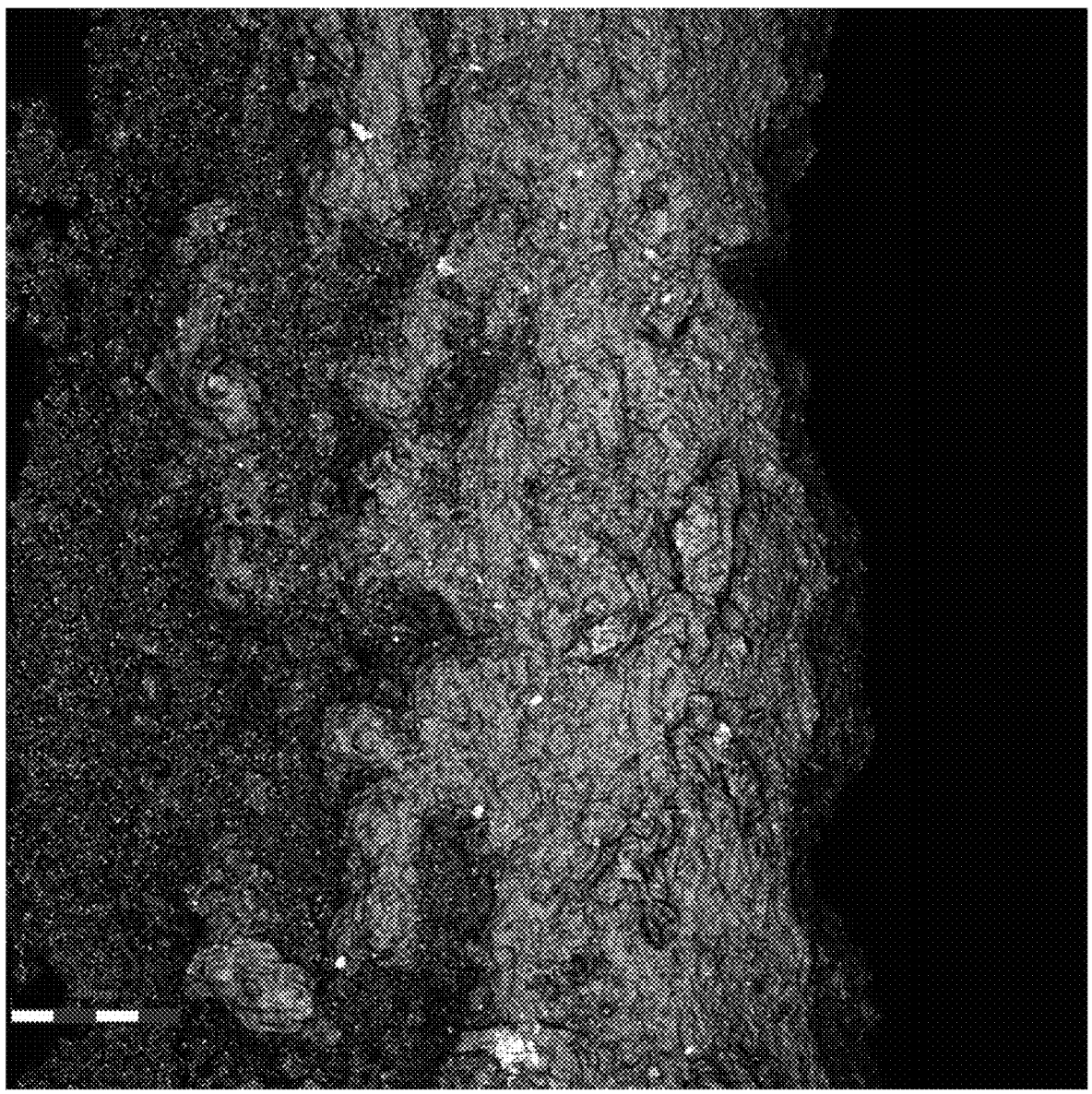
FIG. 6 shows the microscopic morphology of the sectioned surface of the cement paste product treated by the inventive process, using a vibration frequency of 80 KHz, an output power of 25 W, and a vibration duration of 2 hours to 5.5 hours after casting, the vibration being continuous. The laser confocal picture is taken by Olympus OLS4100. The right side is the natural surface of the cement product. It can be seen that a layer of dense, hydrated silicate colloid of about 120 μm is formed on the surface of the product. The left side is the interior of the cement product, which consists of underdeveloped and unhydrated silicate particles.

FIG. 6 shows the microscopic morphology of the sectioned surface of the cement paste product treated by the process this Example, using a vibration frequency of 80 KHz, an output power of 25 W, and a vibration duration of 2 hours to 5.5 hours after casting, the vibration being continuous. The laser confocal picture is taken by Olympus OLS4100. The right side is the natural surface of the cement product. It can be seen that a layer of dense, hydrated silicate colloid of about 120 μm is formed on the surface of the product. The left side is the interior of the cement product.

Figure 7:
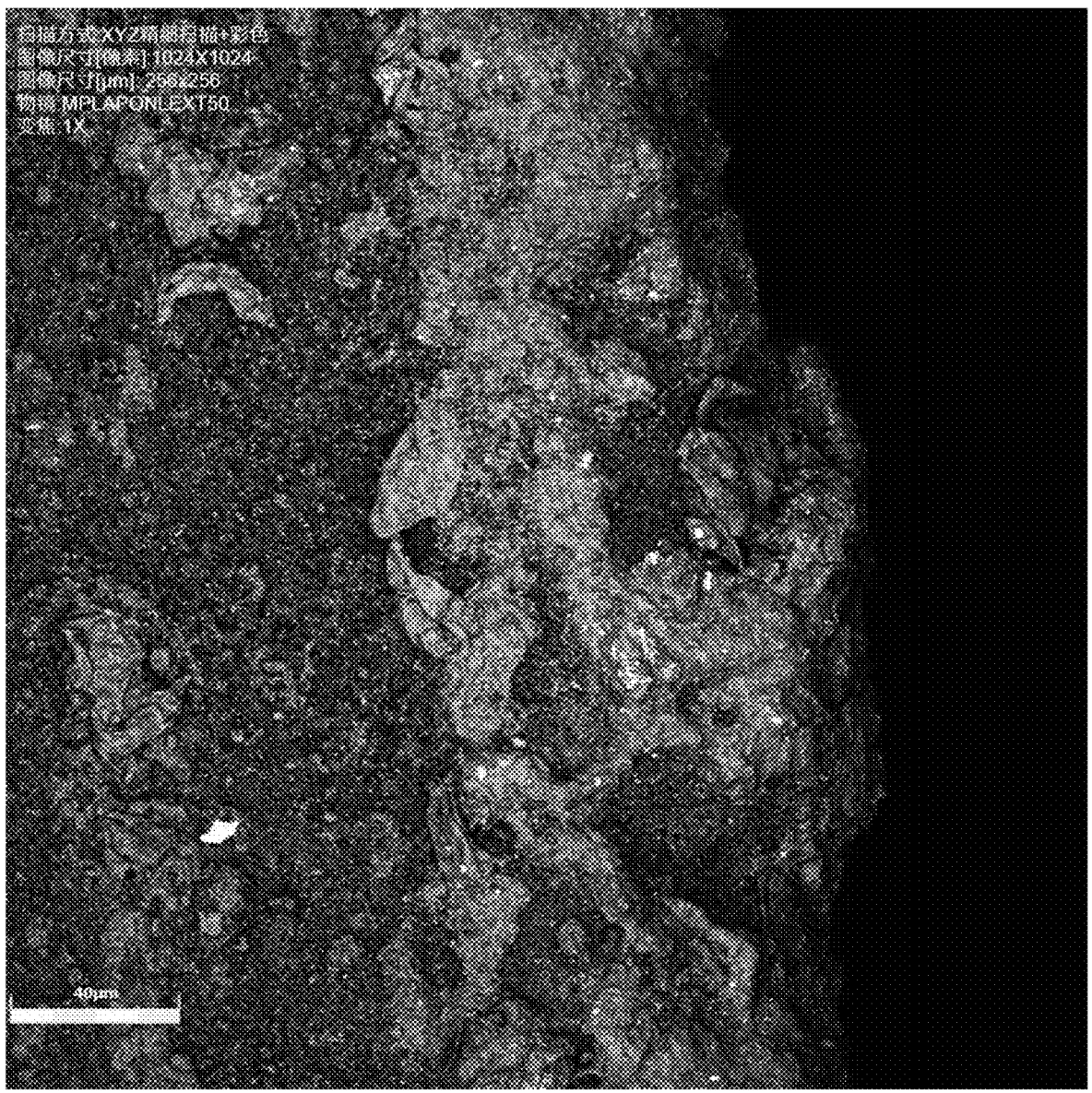
FIG. 7 shows the microscopic morphology of the sectioned surface of the cement paste product treated by the inventive process, using a vibration frequency of 120 KHz, an output power of 15 W, and a vibration duration of 0.5 hours to 3.5 hours after casting, the vibration being continuous. The laser confocal picture is taken by Olympus OLS4100. The right side is the natural surface of the cement product. It can be seen that a layer of dense, hydrated silicate colloid of about 120 μm is formed on the surface of the product. The left side is the interior of the cement product, which consists of underdeveloped and unhydrated silicate particles.

FIG. 7 shows the microscopic morphology of the sectioned surface of the cement paste product treated by the process of this Example, using a vibration frequency of 120 KHz, an output power of 15 W, and a vibration duration of 0.5 hours to 3.5 hours after casting, the vibration being continuous. The laser confocal picture is taken by Olympus OLS4100. The right side is the natural surface of the cement product. It can be seen that a layer of dense, hydrated silicate colloid of about 120 μm is formed on the surface of the product. The left side is the interior of the cement product.

Figure 8:
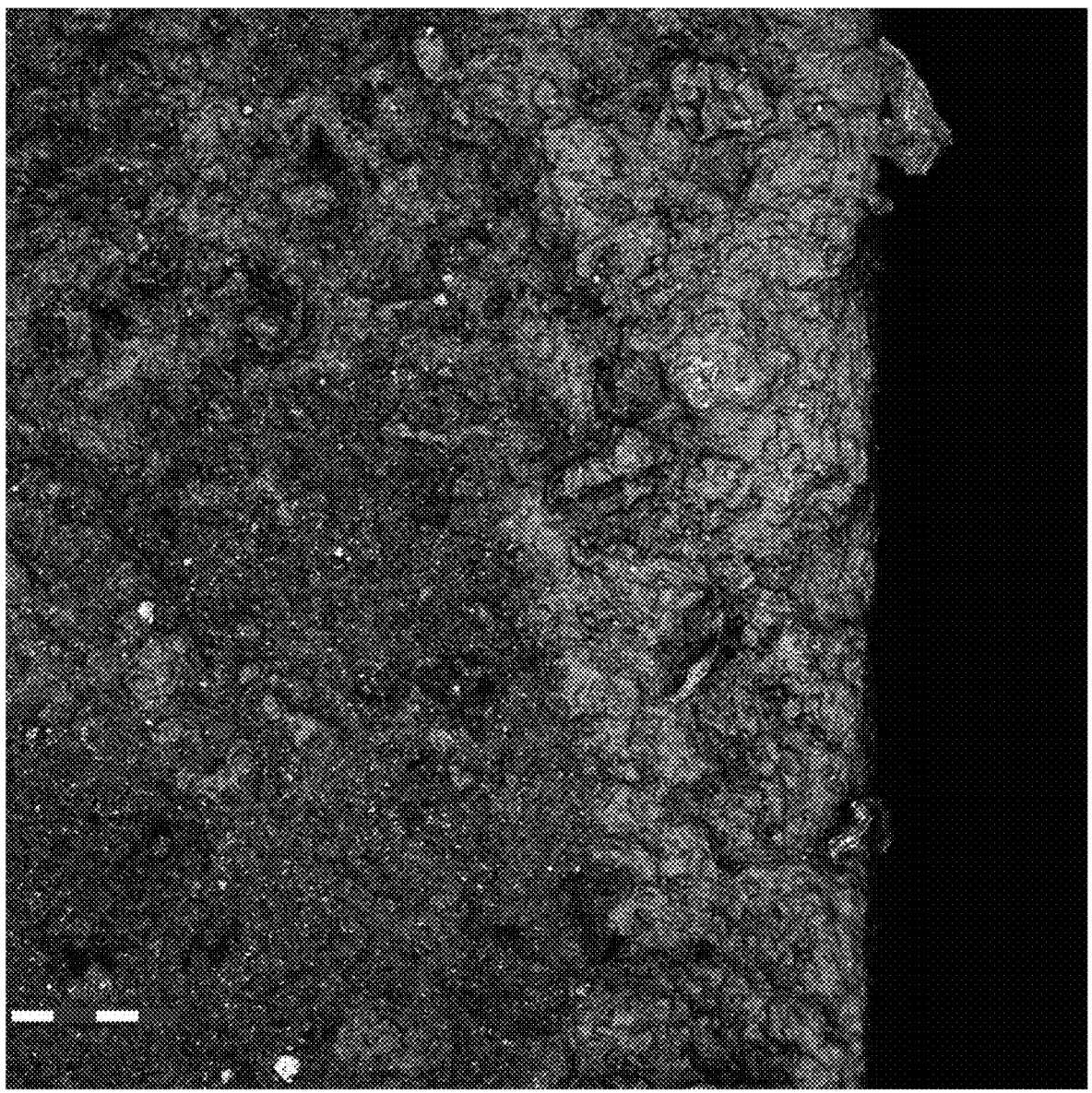
FIG. 8 shows the microscopic morphology of the sectioned surface of the cement product treated according to the inventive process using a vibration frequency of 28 KHz, an output power of 100 W, a vibration duration of 5 hours to 9 hours after casting, by repeated and intermittent vibrations with 15 min of vibration and 45 minutes of interval in an hour and so forth. The laser confocal picture is taken by Olympus OLS4100. The right side is the natural surface of the cement product. It can be seen that a layer of dense, hydrated silicate colloid of about 60 μm to 120 μm is formed on the surface of the cement product. The left side is the interior of the cement product, which consists of underdeveloped and unhydrated silicate particles.

FIG. 8 shows the microscopic morphology of the sectioned surface of the cement product treated according to the process of this Example, using a vibration frequency of 28 KHz, an output power of 100 W, a vibration duration of 5 hours to 9 hours after casting, by repeated and intermittent vibrations with 15 min of vibration and 45 minutes of interval in an hour and so forth. The laser confocal picture is taken by Olympus OLS4100. The right side is the natural surface of the cement product. It can be seen that a layer of dense, hydrated silicate colloid of about 60 μm to 120 μm is formed on the surface of the cement product. The left side is the interior of the cement product.

Figure 9:
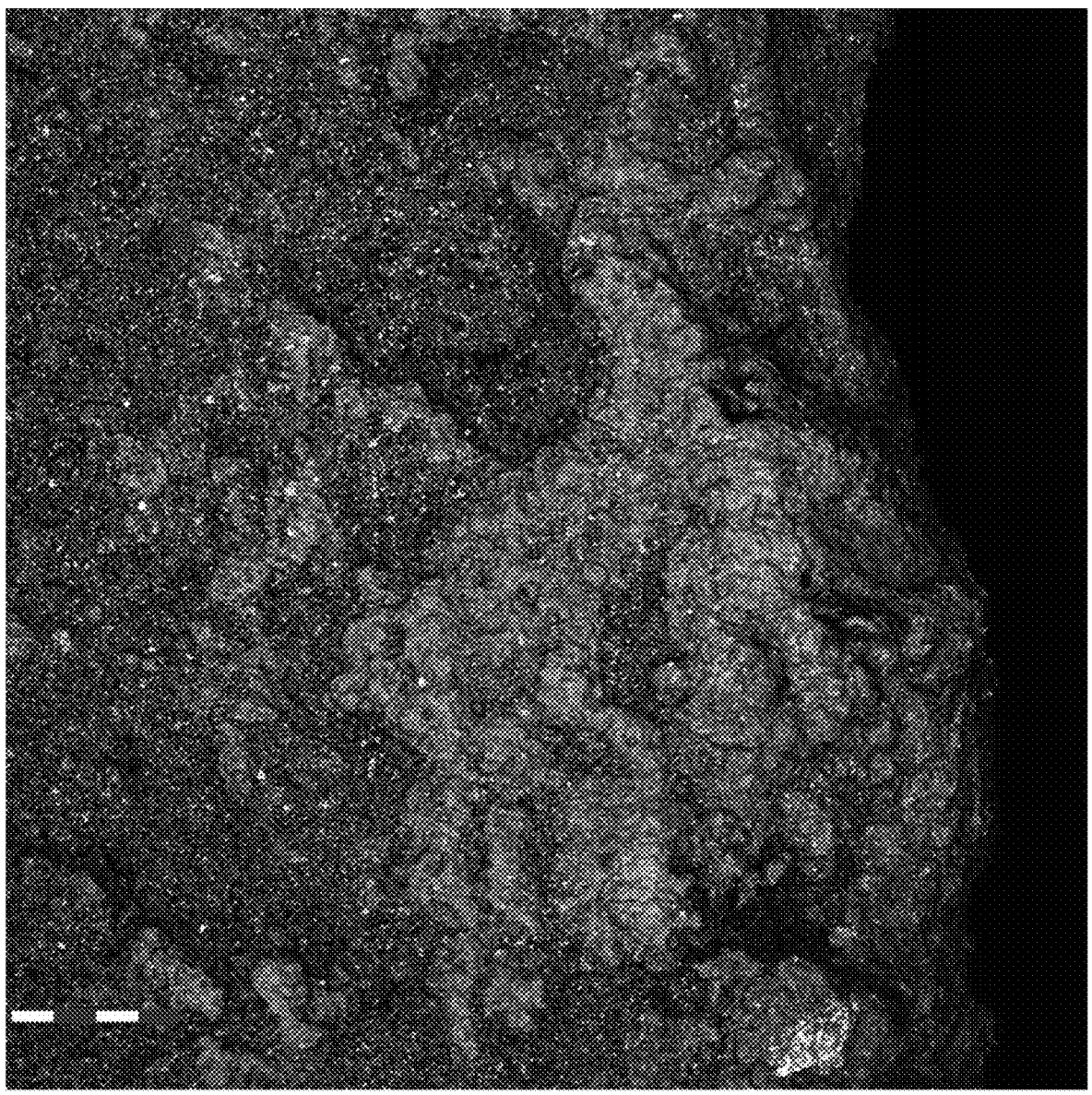
FIG. 9 shows the microscopic morphology of the sectioned surface of the cement product treated according to the inventive process using a vibration frequency of 28 KHz, an output power of 100 W, a vibration duration of 6 hours to 12 hours after casting, by repeated and intermittent vibrations with 15 min of vibration and 45 minutes of interval in an hour and so forth. The laser confocal picture is taken by Olympus OLS4100. The right side is the natural surface of the cement product. It can be seen that a layer of dense, hydrated silicate colloid of about 40 μm to 120 μm is formed on the surface of the cement product. The left side is the interior of the cement product, which consists of underdeveloped and unhydrated silicate particles.

FIG. 9 shows the microscopic morphology of the sectioned surface of the cement product treated according to the process of this Example using a vibration frequency of 28 KHz, an output power of 100 W, a vibration duration of 6 hours to 12 hours after casting, by repeated and intermittent vibrations with 15 min of vibration and 45 minutes of interval in an hour and so forth. The laser confocal picture is taken by Olympus OLS4100. The right side is the natural surface of the cement product. It can be seen that a layer of dense, hydrated silicate colloid of about 40 μm to 120 μm is formed on the surface of the cement product. The left side is the interior of the cement product.

Figure 10:
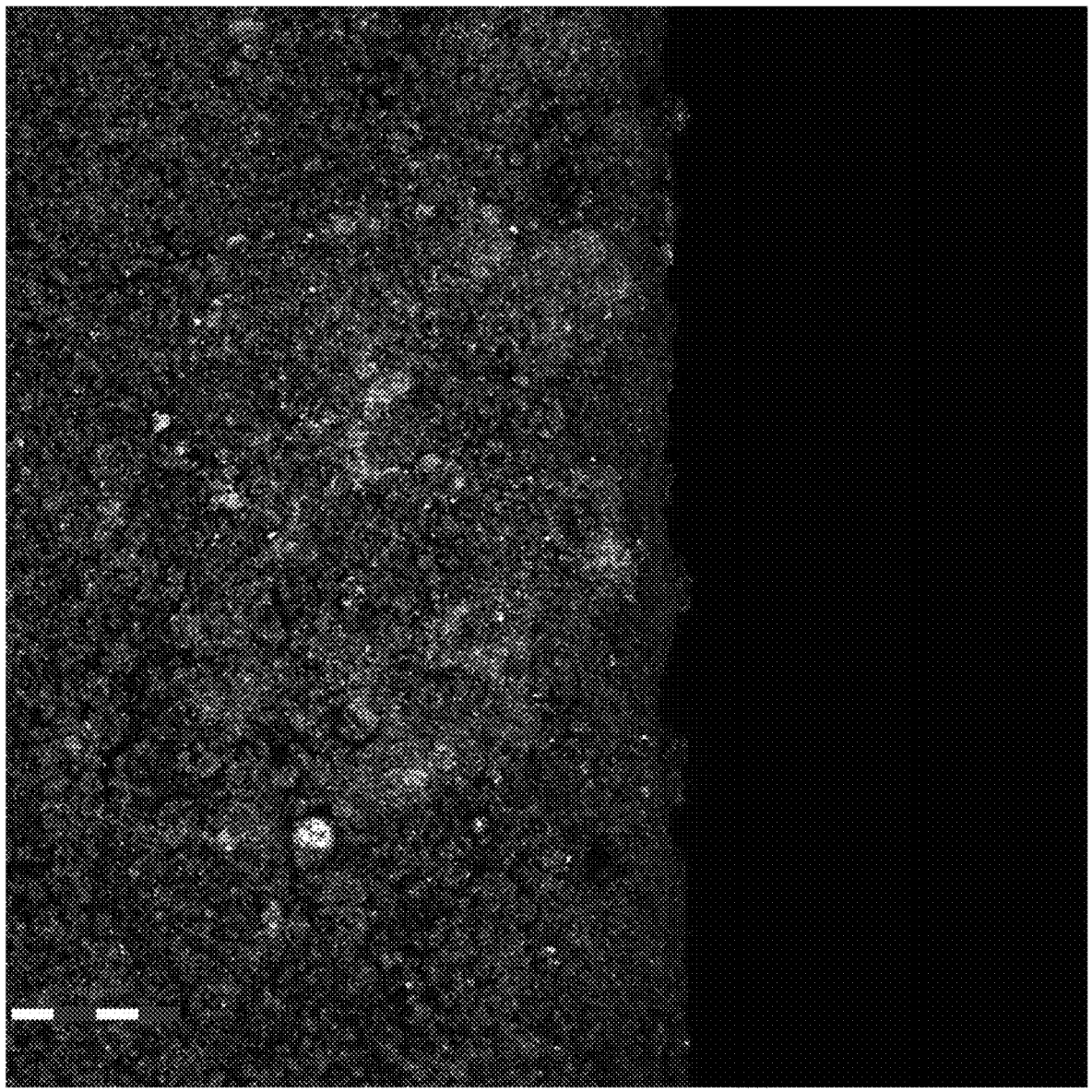
FIG. 10 shows the microscopic morphology of the sectioned surface of the cement product untreated according to the inventive process, a laser confocal picture taken by Olympus OLS4100. The right side is the natural surface of the cement product. It can be seen that no hydrated silicate colloid is formed on the surface of the cement product. The entire section is composed of underdeveloped and non-colloid silicate particles.
Figure 11:
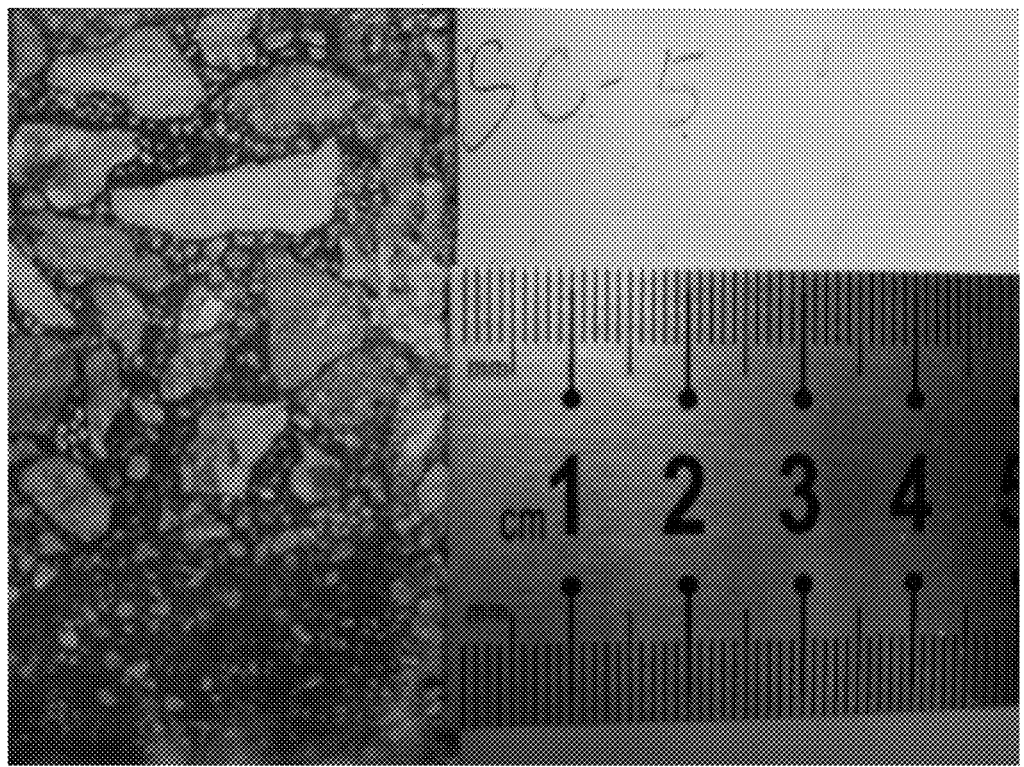
FIG. 11 shows a carbonization depth photo of the cement concrete test block treated by the inventive process shown in FIG. 9 after standard carbonization ("Standard for Test Method for Long-term Performance and Durability of Ordinary Concrete", GB/T50082-2009) (14 days, 20% concentration of carbon dioxide, equivalent to 25 years of natural carbonization). It can be seen that there is no carbonization, and the carbonization depth is 0.

FIG. 10 shows the microscopic morphology of the sectioned surface of the cement paste product untreated according to the process of this Example, a laser confocal picture taken by Olympus OLS4100. The right side is the natural surface of the cement product. It can be seen that no hydrated silicate colloid is formed on the surface of the cement product. FIG. 11 shows a carbonization depth photo of the cement concrete test block treated by the process of this Example shown in FIG. 9 after standard carbonization ("Standard for Test Method for Long-term Performance and Durability of Ordinary Concrete", GB/T50082-2009) (14 days, 20% concentration of carbon dioxide, equivalent to 25 years of natural carbonization). It can be seen that there is no carbonization, and the carbonization depth is 0.

Figure 12:
FIG. 12 shows a carbonization depth photo of the cement concrete test block untreated by the inventive process after standard carbonization ("Standard for Test Method for Long-term Performance and Durability of Ordinary Concrete", GB/T50082-2009) (14 days, 20% concentration of carbon dioxide, equivalent to 25 years of natural carbonization). It can be seen that the carbonization depth exceeds 6 mm.

FIG. 12 shows a carbonization depth photo of the cement concrete test block untreated by the process of this Example after standard carbonization ("Standard for Test Method for Long-term Performance and Durability of Ordinary Concrete", GB/T50082-2009) (14 days, 20% concentration of carbon dioxide, equivalent to 25 years of natural carbonization). It can be seen that the carbonization depth exceeds 6 mm.

Figure 13:
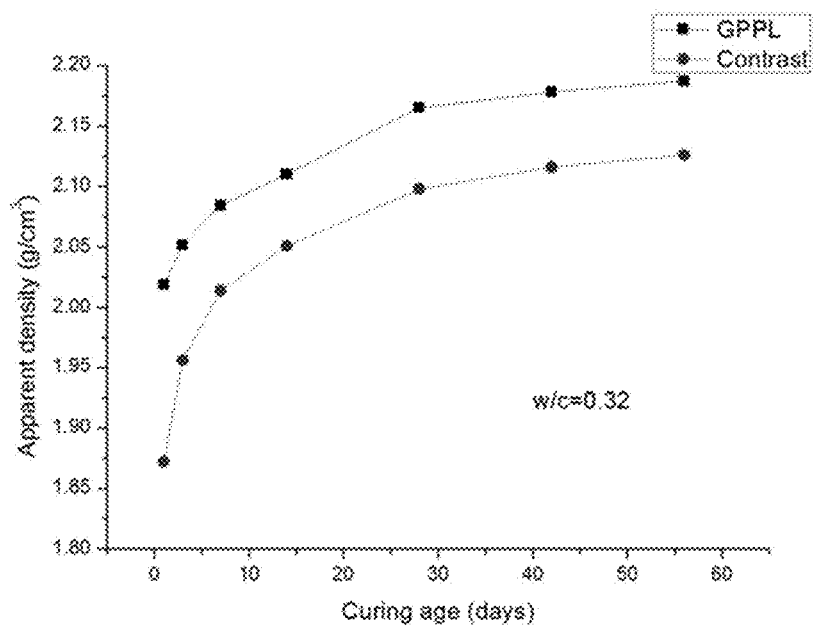
FIG. 13 shows a graph comparing the density of cement paste products treated by the inventive process and the density of cement paste products untreated by the inventive process.

Subsequently, characteristics such as the density, hardness, water vapor permeability, surface reflectivity and surface tension of the silicate colloid were studied. The specific research results are as follows:

1. High Density:

High-frequency vibration is applied to the cement product, so that a layer of dense, hydrated silicate colloid is formed under the action of vibration at the position where the surface layer of the cement product is in contact with the vibration transmitting body. In the later cement hydration process, a layer of well-developed and relatively uniform granular silicate crystals grew on the surface of this layer of hydrated silicate colloid. During the later hydration process, well-developed, uniform and fine-grained crystals were produced on the surface, achieving the effect of microcrystallization. The hydrated silicate colloids with dense surface layer and the microcrystalline hydrate crystals make the surface of cement product denser. As shown in FIG. 13, the cement product having subjected to high frequency vibration have densified hydrated silicate colloids and microcrystalline hydrate crystals formed on its surface.

2. High Surface Hardness

Figure 14A:
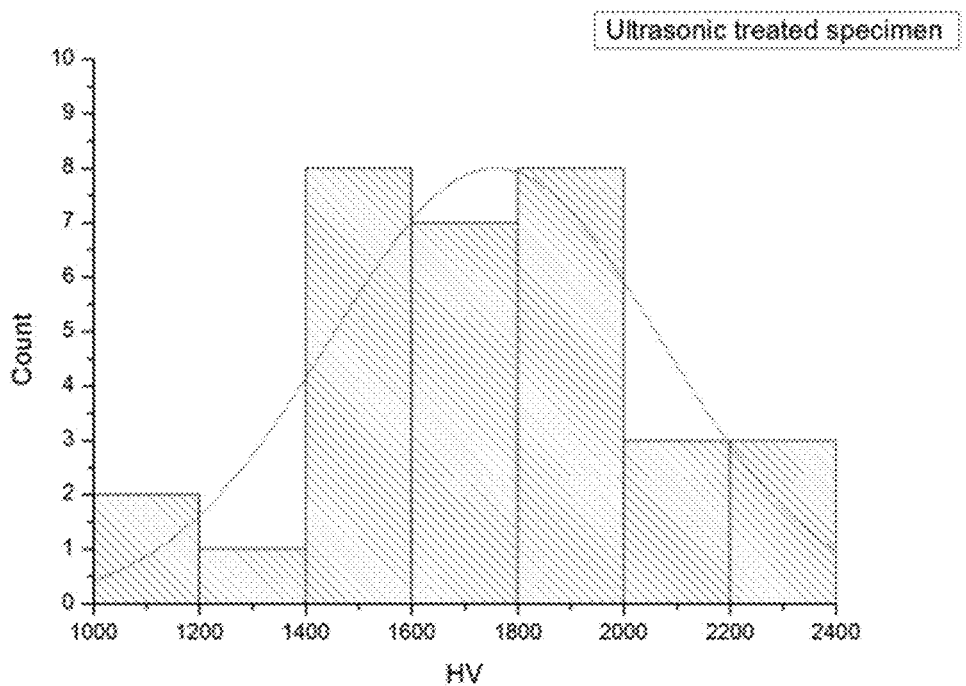
FIG. 14a shows a statistical diagram of the hardness of the surface of a cement paste product treated by the inventive process.
Figure 14B:
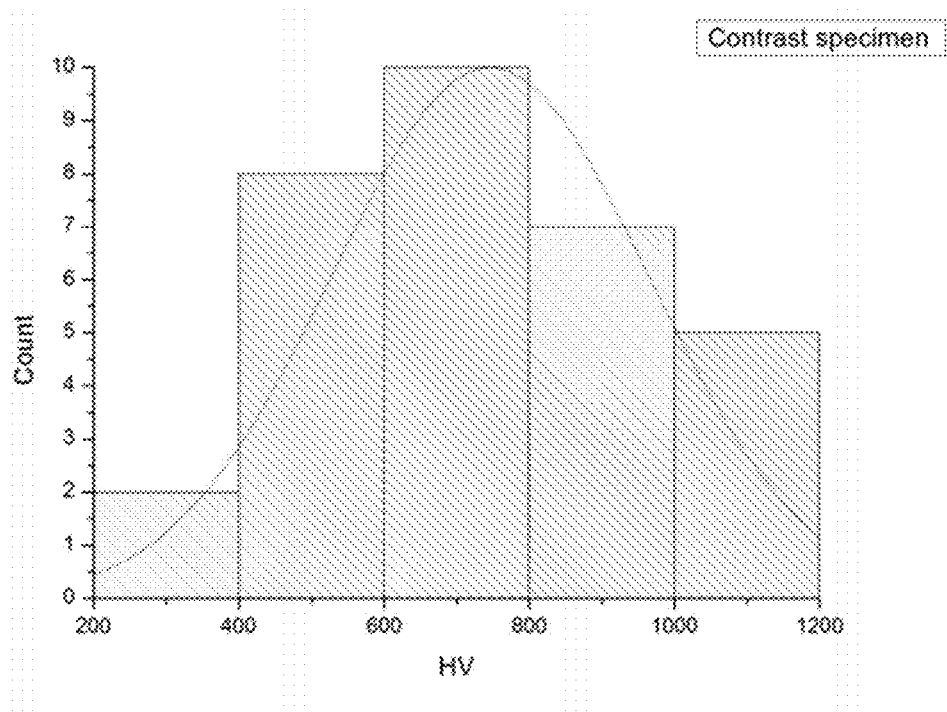
FIG. 14b shows a statistical diagram of the surface hardness of a cement paste product untreated by the inventive process.

Vickers hardness was tested on the surface of the mortar specimen treated with high-frequency vibration using a microhardness tester. The result showed that the average surface hardness after ultrasonic treatment was 1757HV0.1/10, as shown in FIG. 14a; the average surface hardness of the comparative specimen is 746HV0.1/10, as shown in FIG. 14b, which is 135% higher than the comparative specimen.

3. Low Water Vapor Permeability

The water vapor permeability of cement paste specimens treated with high-frequency vibration was tested using ASTM E96-16 method. It is shown that the high-density hydrated silicate colloid layer formed by high-frequency vibration can effectively prevent water vapor penetration.

Figure 15A:
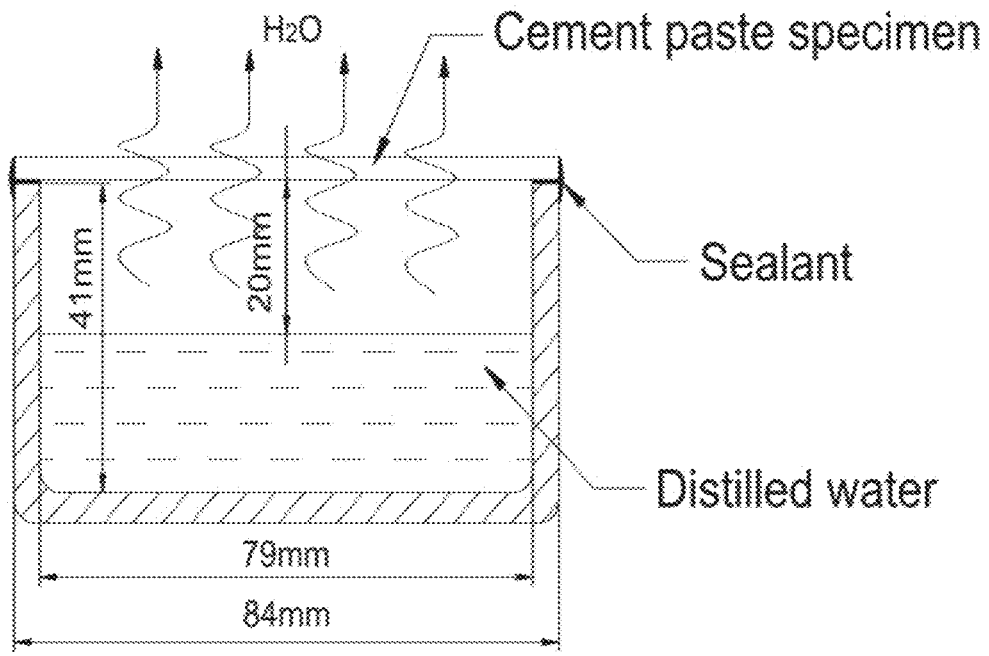
FIG. 15a shows the diagram for testing the water vapor permeability of cement paste specimens treated with ultrasound using the ASTM E96-16 method.

FIG. 15a is a diagram of the test device.

Figure 15B:
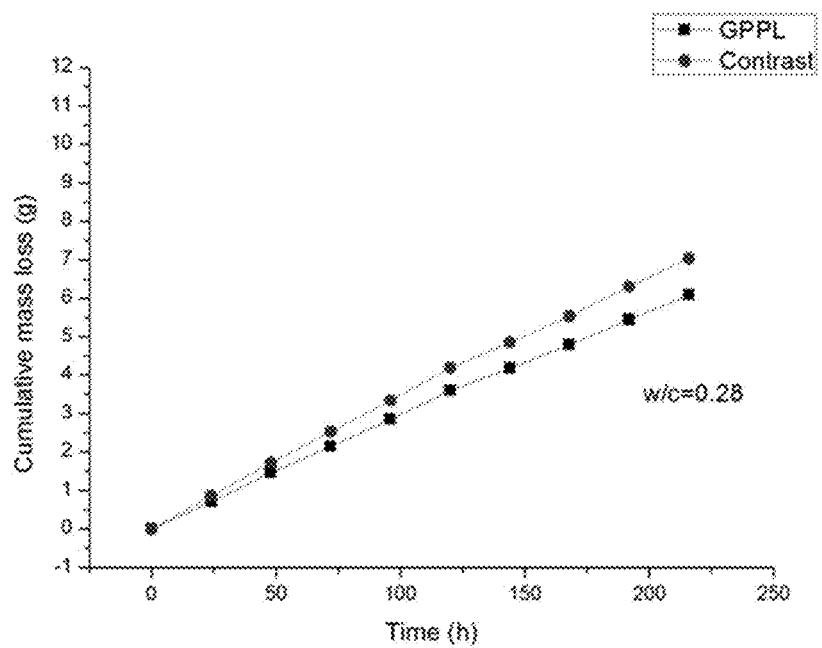
FIG. 15b shows the graph comparing water vapor permeability of the cement paste products treated by the present inventive process and of the cement paste products untreated by the present inventive process when the water-cement ratio is 0.28.
Figure 15C:
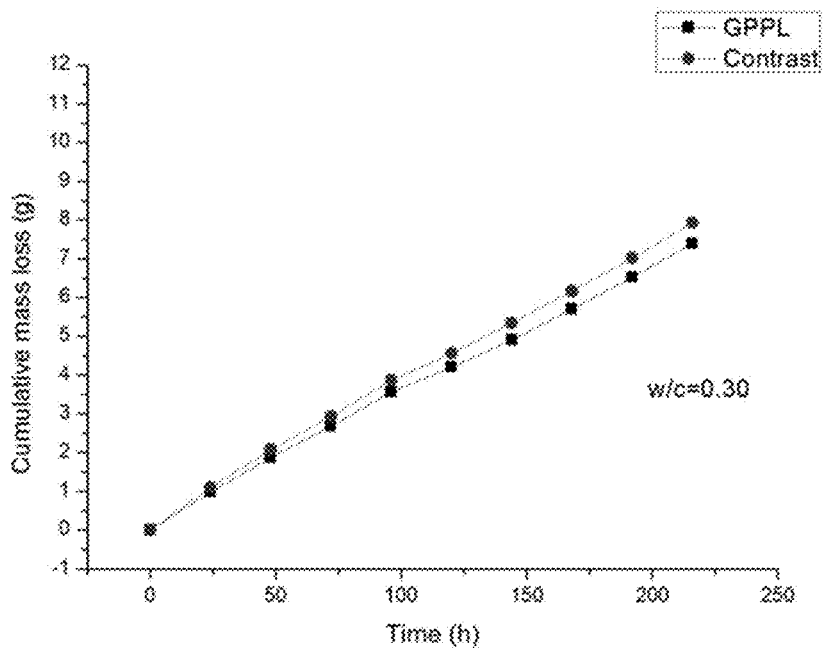
FIG. 15c shows the graph comparing water vapor permeability of the cement paste products treated by the present inventive process and of the cement paste products untreated by the present inventive process when the water-cement ratio is 0.30.
Figure 15D:
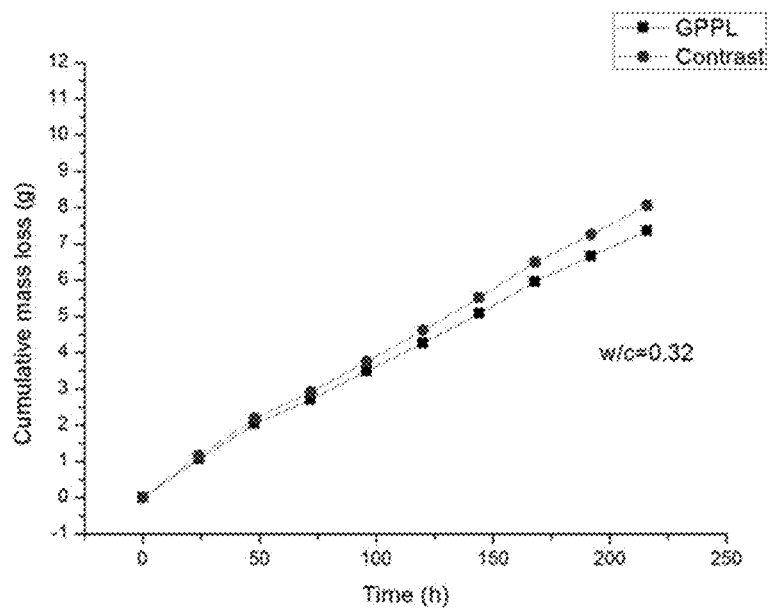
FIG. 15d shows the graph comparing water vapor permeability of the cement paste products treated by the present inventive process and of the cement paste products untreated by the present inventive process when the water-cement ratio is 0.32.

FIG. 15b to FIG. 15d are the diagrams comparing the test data of cement paste specimens with and without high-frequency vibration treatment when the water-cement ratio (W/C) is 0.28, 0.30 and 0.32, respectively.

Since the hydrated silicate colloid and the microcrystalline hydrate crystals make the surface of cement product denser, the water vapor permeability of cement paste specimens treated by high-frequency vibration is low, so that the cement product are more resistant to erosion and the resistance to aging is better.

4. Low Reflectivity to the Full Spectrum

Figure 16:
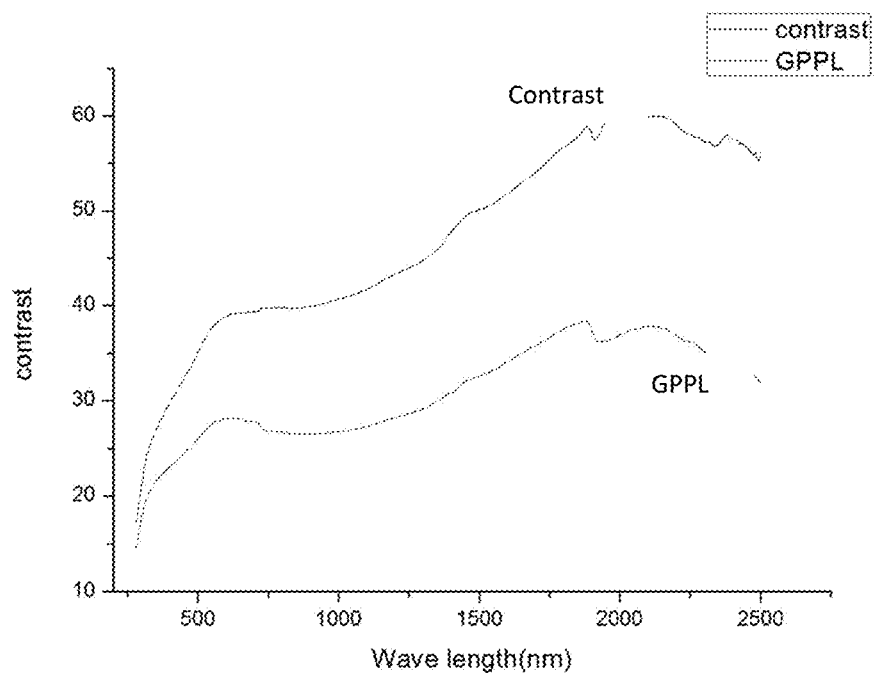
FIG. 16 shows the graph comparing the reflectance at the wavelength of 280 nm-2500 nm on the surface of the cement paste product treated by the present inventive process and of the cement paste product untreated by the present inventive process.

The full spectrum reflectivity of the surface of the cement-based material treated by high-frequency vibration is lower than that of the untreated comparative specimen. This characteristic shows that the cement-based material can absorb more solar radiation, which is beneficial for heat absorption of buildings in cold areas and for heat absorption and ice melting of road materials. The surface of the cement-based material treated by high-frequency vibration has a spectral reflectance 34.5% lower than that of the comparative specimen within the wavelength of 280 nm-2500 nm, as shown in FIG. 16.

5. High Surface Tension

Figure 18B:
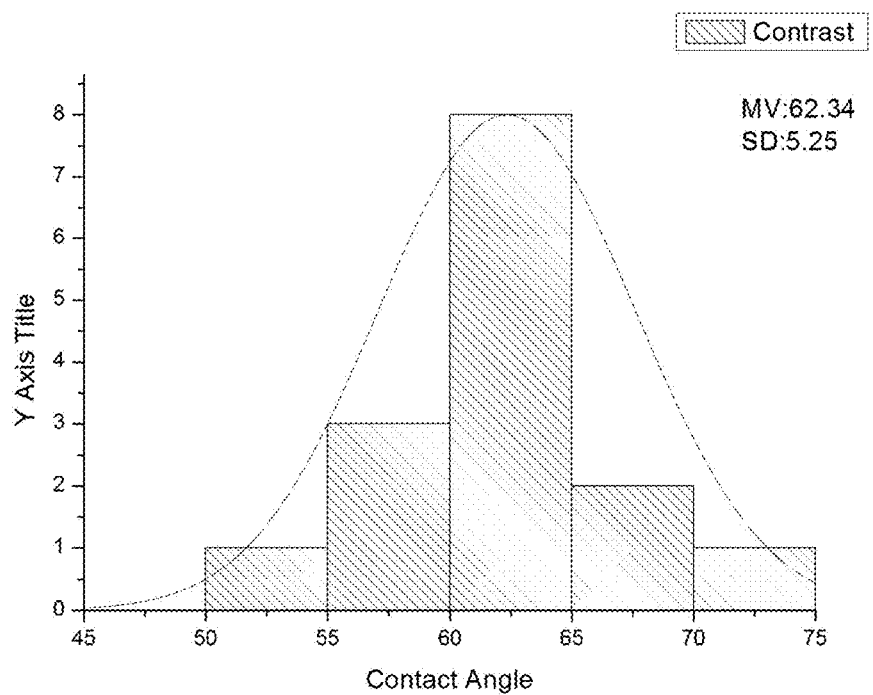
FIG. 18b shows a statistical graph of the surface tension of a cement paste product untreated by the present inventive process, with glycerin as the drip.

As shown in FIG. 17a and FIG. 17b, glycerin is added to the surface with and without the high-frequency vibration treatment of the cement-based material for contact angle testing. FIG. 18a and FIG. 18b show the normal distribution curve of the contact angle test. The average surface contact angle of cement-based materials after high-frequency vibration treatment was 91.18 degrees, and the average surface contact angle of cement-based materials without high-frequency treatment was 62.34 degrees.

The surface of cement-based materials after high-frequency vibration treatment has a higher surface tension, and is not prone to be adsorbed by water droplets. For engineering materials, higher tension can allow raindrops falling on the surface drop out faster, and the substances carried by raindrops that are corrosive to the cement-based materials cannot be easily adsorbed on the surface of the materials. For pavement materials (such as cement pavement bricks, concrete pavements), it means that water droplets will gather and flow away faster, so that they have better anti-slip performance.

The invention claimed is:

1. Special equipment for surface microcrystallization of cementitious materials, characterized in that it includes a vibrator (1), a vibration signal generator (2), a power amplifier (3) and a vibration transmitting body, wherein a signal output terminal of the vibration signal generator (2) is connected to a signal input terminal of the power amplifier (3), a signal output terminal of the power amplifier (3) is connected to a signal input terminal of the vibrator (1), the vibrator (1) is connected directly or indirectly to the vibration transmitting body, and the vibration transmitting body is to be in contact with an inner surface and/or outer surface of the cast cement product (6)

wherein the vibration transmitting body is a mold, the cement product (6) is located in the mold (4), and the vibrator (1) is placed on the mold (4), and vibration transmitting body is an inner mold (5), and a part of the inner mold (5) is in contact with the inner surface of the cement product (6), and the other part is located outside the cement product (6), and the vibrator (1) is placed on the part of the inner mold (5) located outside the cement product (6); and the vibration frequency generated by the vibration signal generator (2) is greater than or equal to 1 KHz.

2. A method for surface microcrystallization of cementitious materials, characterized in that it comprises the following steps:
   A. Preparing raw materials for casting cement product according to cement product preparation method in the prior art;
   B. Installing the vibrator (1) onto the vibration transmitting body, and connecting the vibration signal generator (2) and the power amplifier (3); the signal output terminal of the vibration signal generator (2) being connected to the signal input terminal of the power amplifier (3), the signal output terminal of the power amplifier (3) being connected to the signal input terminal of the vibrator (1);
   C. Casting to obtain a cement product (6), and bringing the vibration transmitting body into contact with the cement product (6); in the time period after the cement product is cast until the final setting, turning on the vibration signal generator (2) and the power amplifier (3) so as to apply vibration to the cement product (6);
   D. Removing the vibrator (1) and performing conventional maintenance operations on the cement product (6) after the cement product is finally set.

3. The method for surface microcrystallization of cementitious materials according to claim 2, characterized in that the process of surface microcrystallization of cement product is as follows:
   A. Preparing raw materials for casting cement product according to cement product preparation method in the prior art;
   B. Installing the vibrator (1) onto the mold (4), and connecting the vibration signal generator (2) and the power amplifier (3); the signal output terminal of the vibration signal generator (2) being connected to the signal input terminal of the power amplifier (3), the signal output terminal of the power amplifier (3) being connected to the signal input terminal of the vibrator (1);
   C. Casting into the mold (4) to obtain a cement product (6), and turning on the vibration signal generator (2) and the power amplifier (3) so as to apply vibration to the cement product (6); the vibration is applied after casting and before final setting;
   D. Removing the vibrator (1) and performing conventional maintenance operations on the cement product (6) after the cement product is finally set.

4. The method for surface microcrystallization of cementitious materials according to claim 2, characterized in that the process of internal microcrystallization of cement product is as follows:
   A. Preparing raw materials for casting cement product according to cement product preparation method in the prior art;
   B. Installing the vibrator (1) onto the inner mold (5), and connecting the vibrator (1), the vibration signal generator (2) and the power amplifier (3); the signal output terminal of the vibration signal generator (2) being connected to the signal input terminal of the power amplifier (3), the signal output terminal of the power amplifier (3) being connected to the signal input terminal of the vibrator (1);
   C. Casting to obtain a cement product (6); after the cement product is cast, turning on the vibration signal generator (2) and the power amplifier (3) so as to apply vibration to the outer or inner surface of the cement product (6); the vibration is applied after casting and before final setting;
   D. Removing the vibrator (1) and performing conventional maintenance operations on the cement product (6) after the cement product is finally set.

5. The method for surface microcrystallization of cementitious materials according to claim 2, characterized in that the vibration frequency is in the range from 20 KHz to 120 KHz.

* * * * *